(12) United States Patent
Miranda-Steiner et al.

(10) Patent No.: US 10,747,728 B2
(45) Date of Patent: Aug. 18, 2020

(54) EDIT AND SHARE UNSUPPORTED FILES THROUGH INSTANTLY GENERATED PREVIEW

(71) Applicant: MICROSOFT TECHNOLOGY LICENSING, LLC, Redmond, WA (US)

(72) Inventors: Jose Emmanuel Miranda-Steiner, Seattle, WA (US); Steven J. Bailey, Bellevue, WA (US); John D. Rodrigues, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 15/674,115

(22) Filed: Aug. 10, 2017

(65) Prior Publication Data

US 2019/0050420 A1 Feb. 14, 2019

(51) Int. Cl.

| | | |
|---|---|---|
| *G06F 17/00* | (2019.01) | |
| *G06F 16/178* | (2019.01) | |
| *G06F 9/50* | (2006.01) | |
| *H04L 29/08* | (2006.01) | |
| *G06F 16/25* | (2019.01) | |

(Continued)

(52) U.S. Cl.
CPC .......... *G06F 16/178* (2019.01); *G06F 9/5055* (2013.01); *G06F 16/25* (2019.01); *G06F 40/106* (2020.01); *G06F 40/14* (2020.01); *G06F 40/166* (2020.01); *H04L 67/08* (2013.01);

(Continued)

(58) Field of Classification Search
CPC .. G06F 17/24; G06F 17/30011; G06F 17/212; G06F 16/178
See application file for complete search history.

(56) References Cited

U.S. PATENT DOCUMENTS 9,176,953 B2 11/2015 Wang
9,310,981 B2 4/2016 Lynch et al.
(Continued)

OTHER PUBLICATIONS

"Document Collaboration and Co-authoring", Retrieved From <<https://support.office.com/en-us/article/Document-collaboration-and-co-authoring-ee1509b4-1f6e-401e-b04a-782d26f564a4>> Retrieved Date: Jun. 22, 2017, 6 Pages.

(Continued)

*Primary Examiner* — Andrew T McIntosh
(74) *Attorney, Agent, or Firm* — Michael Best & Friedrich LLP

(57) ABSTRACT

As users increasingly shift to cloud services, devices are less likely to be pre-loaded with applications that support the multitudes of different file types that exist today and are continuing to be created. Thus, embodiments are directed to editing and sharing unsupported files through an instantly generated preview without having to install applications that support each file type and/or subscribe to services. For example, in response to detecting a user's request to access a file that is stored locally and determining a lack of a local application or previewer associated with the file, a preview that includes a presentation of the file using a registered previewer may be instantly generated. The preview may be rendered such that the file can be edited and/or shared through the previewer based on a level of editing and/or sharing functionality, respectively, where the levels of functionality are based on the user's subscription status.

7 Claims, 9 Drawing Sheets

(51) Int. Cl.
*G06F 40/14* (2020.01)
*G06F 40/106* (2020.01)
*G06F 40/166* (2020.01)
*G06F 16/188* (2019.01)
*G06F 40/197* (2020.01)

(52) U.S. Cl.
CPC .......... H04L 67/10 (2013.01); H04L 67/1095 (2013.01); *G06F 16/188* (2019.01); *G06F 40/197* (2020.01)

(56) References Cited

U.S. PATENT DOCUMENTS

| | | |
|---|---|---|
| 9,529,819 B2 | 12/2016 | Leibovici et al. |
| 9,596,303 B2 | 3/2017 | Simmons et al. |
| 9,639,511 B2 | 5/2017 | Hariharan et al. |
| 2011/0302503 A1* | 12/2011 | Cahill .................... G06Q 10/10 715/751 |
| 2012/0110445 A1* | 5/2012 | Greenspan .......... G06F 17/2288 715/256 |
| 2013/0080785 A1* | 3/2013 | Ruhlen ................... H04L 67/16 713/176 |
| 2013/0185395 A1* | 7/2013 | Chaturvedi ......... H04L 67/1097 709/217 |
| 2013/0254656 A1 | 9/2013 | Florian |
| 2015/0058286 A1* | 2/2015 | Leibovici .............. G06F 9/5055 707/610 |

OTHER PUBLICATIONS

Karna, "Editing Files with Box Edit", Retrieved From <<https://community.box.com/t5/Content-Management/Box-Edit/ta-p/19160>> Jul. 12, 2016, 8 Pages.

* cited by examiner

EDIT AND SHARE UNSUPPORTED FILES THROUGH INSTANTLY GENERATED PREVIEW

BACKGROUND

Increasingly, cloud based resources are utilized for a variety of services that include hosting and/or management services, among others that facilitate hosting, processing, classification, and/or management, among other operations associated with assets such as files. As more users shift to these cloud based resources, fewer users have devices pre-loaded with applications that support viewing, editing and/or sharing of the multitudes of different file types that exist today and are continuing to be created, and the users often lack the space to install and keep such applications updated. Additionally, it has become a challenge for users to seamlessly and securely share their local files out with others, often causing users to subscribe to a cloud service (i.e., create an account with the service) or use other traditional means to send a file, such as attach the file to an email or store the file on a USB flash drive that is physically delivered to a recipient.

In an ever connected world where users are employing several devices per day to interact with others personally and for work, it would be optimal to have the capability of editing all relevant file types, regardless of which device is being employed or the applications installed on that particular device, and sharing them with others in a seamless and secure manner.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to editing and/or sharing an unsupported file through an instantly generated preview. A request from a user to access a file that is stored locally may be detected. In response to determining a lack of a local application or previewer associated with the file, a preview may be requested from a server associated with the file by providing the file to the server. The preview may include a presentation of the file using a previewer registered with the server. The preview may be rendered upon receipt from the server such that the file can be edited and/or shared based on a level of editing functionality and/or a level of sharing functionality, respectively, provided through the previewer. The level of editing functionality and the level of sharing functionality may be based on a subscription status of the user. In response to detecting that the file has been edited, the edited file may be provided to the server to be remotely stored and/or the file that is stored locally may be replaced with the edited file. In response to detecting a share action associated with the file, the file may be provided to the server to share the file, where the server may remotely store the shared file, generate a link for a location at which the shared file is remotely stored, and provide the link to recipients of the shared file.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
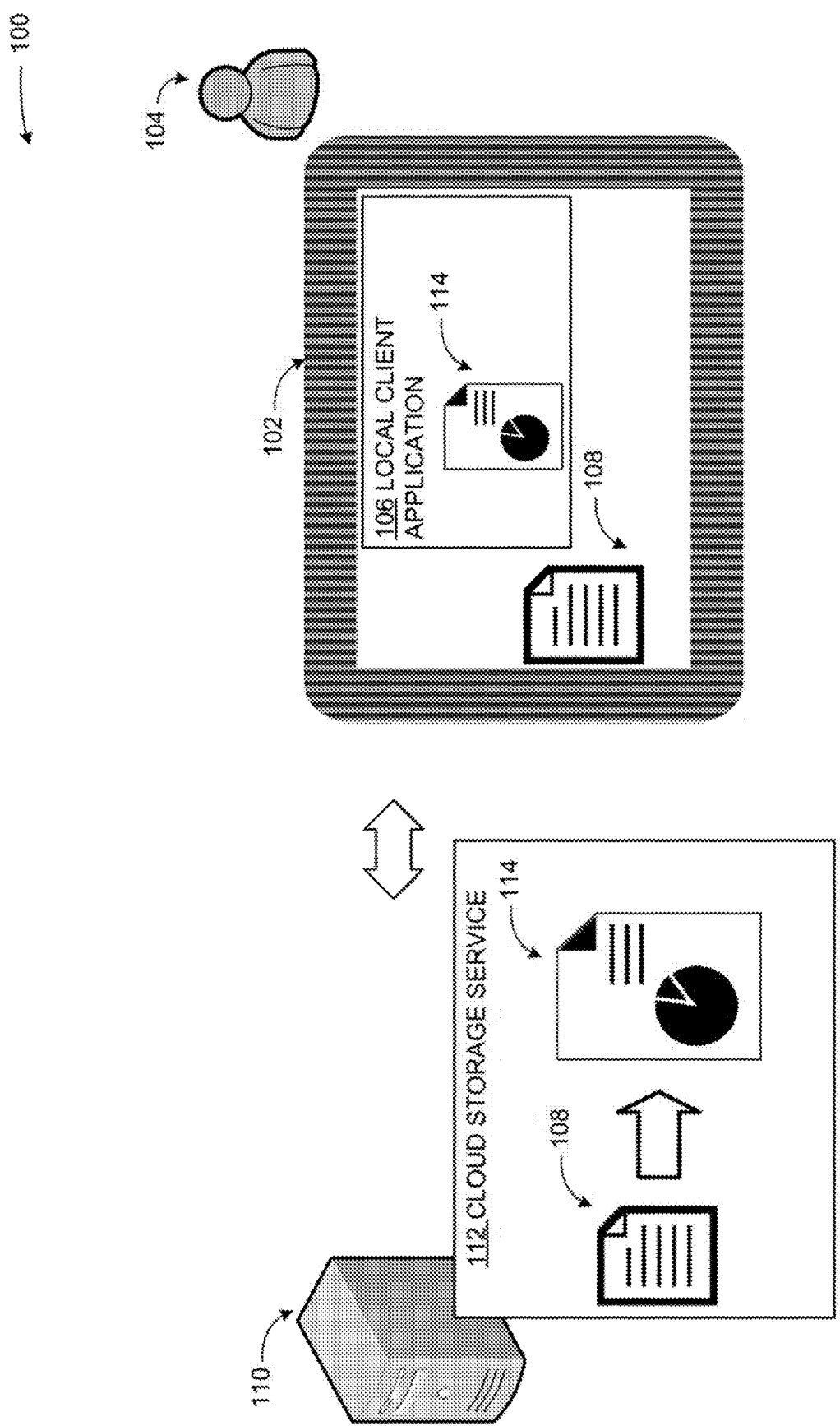
FIG. 1 includes a conceptual diagram illustrating an example system configured to provide an instant preview of an unsupported file through which the file may be edited and/or shared, according to embodiments.

As briefly described above, a client application, such as a file management and/or synchronization application, may render an instant preview of a locally unsupported file through which a user may edit and/or share the file. In an example scenario, the client application may detect a request from a user to access a file that is locally stored. In response to a determination that a local application or previewer is not available for the file, the client application may send the file along with a request for a preview to a cloud service, where the preview includes a presentation of the file using a previewer.

The client application may render the preview upon receipt from the cloud service such that the file can be edited and/or shared based on a level of editing functionality and/or a level of sharing functionality, respectively, provided through the previewer. The level of editing functionality and the level of sharing functionality may be based on a subscription status of the user (i.e., whether or not the user has an account with the cloud service and a level of the account). In some embodiments, the cloud service may provide incentives or offers to the user associated with the level of editing functionality and the level of sharing functionality through the previewer. For example, the cloud service may offer to make the level of editing functionality and/or the level of sharing functionality less restrictive if the user updates their subscription status.

In response to detecting that the file has been edited, the client application may provide the edited file to the cloud service to be remotely stored and/or replace the file that is stored locally with the edited file. Additionally and/or alternatively, in response to detecting a share action associated with the file, the client application may provide the file to the server to share the file, where the server may remotely store the shared file, generate a link for a location at which the shared file is remotely stored, and provide the link to recipients of the shared file.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for editing and/or sharing an unsupported file through an instantly generated preview. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 includes a conceptual diagram illustrating an example system to provide an instant preview of an unsupported file through which the file may be edited and/or shared, according to embodiments.

In a diagram 100, a computing device 102 may execute (or provide) a local client application 106. In some examples, the local client application 106 may be a file management application or a synchronization application. In other examples, the local client application 106 may also be a client application of a communication service, a cloud storage service, a collaboration service, or a productivity service, among other similar services, where the local client application 106 may allow users to interact with and access theses services. A user 104 may interact with the local client application 106 employing a keyboard based input, a mouse based input, a voice based input, a pen based input, and a gesture based input, among others. The gesture based input may include one or more touch based actions such as a touch action, a swipe action, and a combination of each, among others. The computing device 102 may include a desktop computer, a laptop computer, a tablet computer, a vehicle-mount computer, a smart phone, or a wearable computing device, among other similar devices.

The computing device 102 may interact with a server 110 that executes a cloud storage service 112. A service (such as the cloud storage service 112) may include an application performing operations in relation to a client application and/or a subscriber, among others. The server 110 may include and/or is part of a workstation, a data warehouse, a data center, and/or a cloud based distributed computing source, among others. The computing device 102 may communicate with the server 110, and/or other cloud based storage provider, through a network. The network may provide wired or wireless communications between network nodes such as the computing device 102, the server 110, and/or the cloud based storage provider, among others.

In an example embodiment, the local client application 106 may detect a request from the user 104 to access a locally stored file 108. For example, a hover action, a click action, or a tap action performed by the user 104 on a representation of the locally stored file 108 may be detected through a user interface of the local client application 106. In response to a determination that there is no local previewer through which the user 104 may view, edit, and/or share the locally stored file 108 (e.g., none of the local applications installed on the computing device 102 are capable of supporting a type of the locally stored file 108), the local client application 106 may send a copy of the locally stored file 108 to the cloud storage service 112. The cloud storage service 112 may search and determine a previewer associated with the type of the locally stored file 108, generate a preview 114 for the locally stored file 108, and send the preview 114 back to the local client application 106 to be rendered.

The cloud storage service 112 may host the locally stored file 108 temporarily until the preview 114 of the file is generated. The preview 114 may include a presentation of the locally stored file 108. The presentation may include image(s) of a content of the locally stored file 108. In another example scenario, the preview 114 may also have interactive element(s) that may be located in the locally stored file 108 (such as a fillable form). Upon receiving the preview 114 associated with the locally stored file 108 from the cloud storage service 112 provided by the server 110, the local client application 106 may render the preview 114. Alternatively, the local client application 106 may instruct the operating system (executed by the computing device 102) to have the preview 114 rendered by another application and/or module capable of rendering the preview 114. For example, the local client application 106 may render the preview 114 as a desktop application, a workstation application, and/or a server application, among others.

In addition to being able to view the locally stored file 108 through the preview 114, the user 104 may edit and/or share the locally stored file 108 through the preview 114. The locally stored file 108 may be edited based on a level of editing functionality, and shared based on a level of sharing functionality provided through the preview 114. The level of editing and/or sharing functionality may be based on a subscription status of the user 104. The subscription status of the user 104 may be a non-subscriber or a subscriber to the cloud service, where there may be many different levels of subscriber based on how many and/or what types of services the user 104 is subscribed to within the cloud service. For example, if the user 104 is a subscriber, the level of editing and/or sharing functionality may be less restrictive than if the user was a non-subscriber. In some embodiments, the cloud storage service 112 may provide incentives or offers to the user associated with the level of editing and/or sharing functionality through the preview 114. For example, the cloud storage service 112 may offer to make the level of editing and/or sharing functionality less restrictive if the user updates their subscription status from non-subscriber to subscriber, or, if the user is already a subscriber, if the user adds additional services to their subscription to become a higher level subscriber.

In response to detecting that the locally stored file 108 has been edited through the preview 114, the local client application 106 may provide the edited file to the cloud storage service 112 to be remotely stored and/or replace the locally stored file 108 with the edited file. Thus, the user 104 was able to edit and save the locally stored file 108 without having to install a local application to support the file type on the computing device 102 and without having to become a subscriber or a higher level subscriber to the cloud service.

Additionally or alternatively, in response to detecting a share action associated with the locally stored file 108 through the preview 114, the local client application 106 may provide the locally stored file 108 to the cloud storage service 112 to share the locally stored file 108. The cloud storage service 112 may be configured to generate a link for a location at which the shared file is remotely stored and provide the link to recipients of the shared file. The link may be provided to the recipients through a communication item, such as an email message or a text message. Upon selection of the link, the recipients can view, edit, and/or share the shared file in a similar manner to the user 104 (e.g., through the preview 114) without having to install a local application to support the file type or without having to become a subscriber to the cloud service. In some embodiments, the view, edit, and/or share functionalities provided to the recipients may be similar or more restrictive than the functionalities provided to the user 104 through the preview 114. In other embodiments, the view, edit, and/or share functionalities provided to one or more of the recipients may be less restrictive, for example, if the recipient is a subscriber and the user 104 is a non-subscriber.

While the example system in FIG. 1 has been described with specific components including the computing device 102, the local client application 106, and the server 110 hosting the cloud storage service 112. Embodiments are not limited to these components or system configurations and can be implemented with other system configuration employing fewer or additional components.

As previously discussed, as more users shift to cloud based resources, fewer users have devices pre-loaded with applications that support viewing, editing and/or sharing of each of the multitudes of different file types that exist today and are continuing to be created, and the users often lack the space to install and keep such applications updated. Additionally, it has become a challenge for users to seamlessly and securely share their local files out with others, often causing users to create a cloud based account or use other traditional means to send a file. Thus, embodiments as described herein address this problem by enabling any type of file to be edited and/or shared through an instantly generated preview without requiring the user and/or recipients of shared files to have applications that support the specific file types installed on their devices and to have a cloud service subscription or account. By not requiring the installation of applications, both storage space and processing may be reduced. Additionally, user efficiency and interactivity may be increased as users may more seamlessly and securely edit and share files with other users whom they may be co-authoring documents with, for example, especially when some or all of the users may not have a cloud service subscription or account.

Embodiments, as described herein, address a need that arises from a lack of efficiency to edit and share unsupported files. The actions/operations described herein are not a mere use of a computer, but address results that are a direct consequence of software used as a service offered to large numbers of users and applications.

Figure 2:
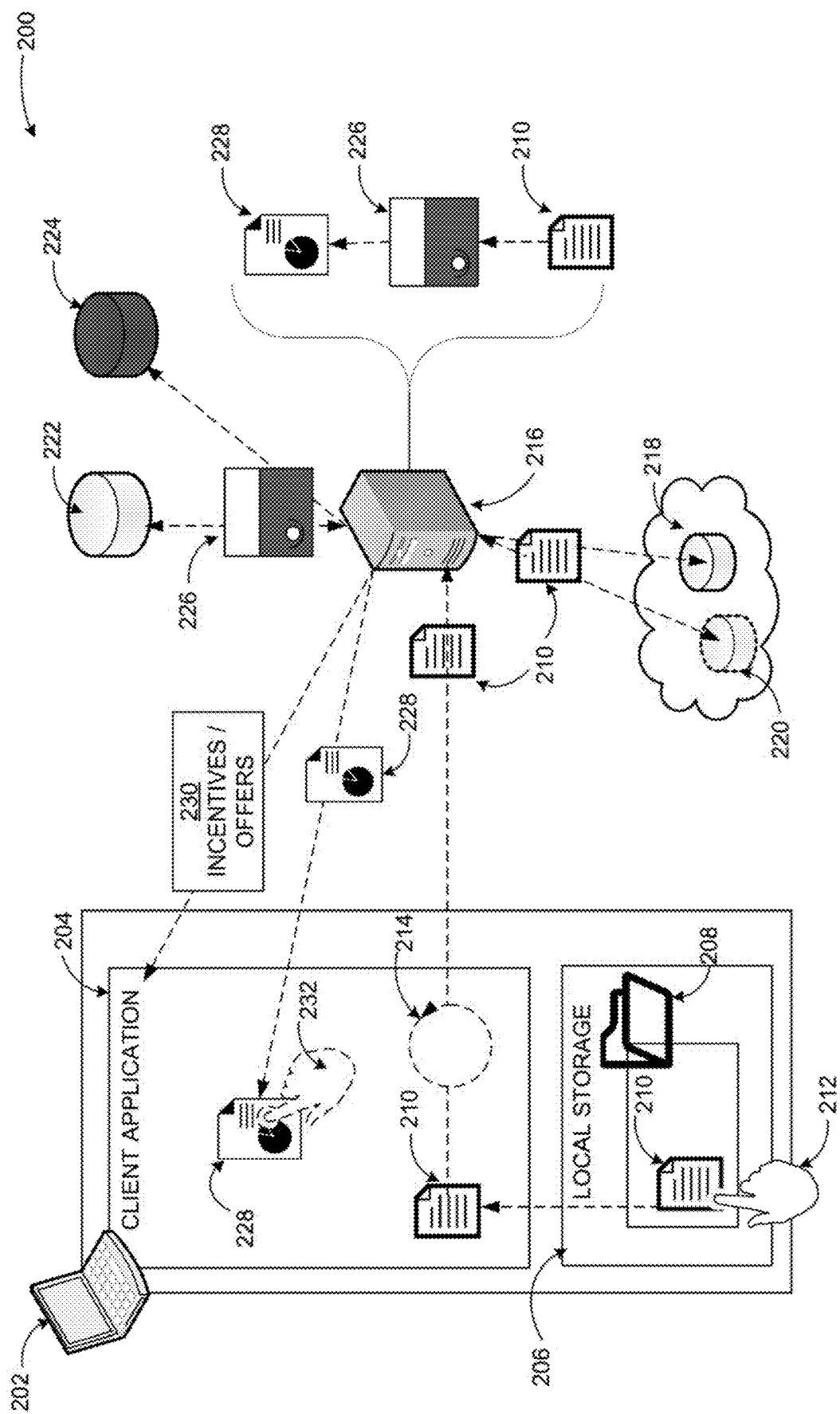
FIG. 2 includes a display diagram illustrating example components and actions for providing an instant preview of an unsupported file through which the file may be edited and/or shared, according to embodiments.

FIG. 2 includes a display diagram illustrating example components and actions for providing an instant preview of an unsupported file through which the file may be edited and/or shared, according to embodiments.

As illustrated in diagram 200, a file 210 may be stored within local storage 206 of a computing device 202 (e.g., in a folder 208 of a hard drive of the computing device 202). A client application 204 executed on the computing device 202 may provide services associated with the file 210 such as executing the file, processing the file, sharing the file, etc. A user interface of the client application 204 may present a representation of the file 210 such as an icon or comparable image/graphic. A user's request to access the file 210 may be detected by a hovering action or clicking or tapping 212 on the representation of the file 210. Upon detecting the request, the client application 204 may first perform a check 214 to determine if a local previewer is available for the file 210, for example, by querying an operating system of the computing device 202 for currently installed applications on the computing device 202 that are capable of supporting a type of the file 210. If no local previewer is available, the client application 204 may send a copy of the file 210 to a cloud service executed on a server 216, for example. The cloud service may include a cloud storage service, a productivity service, a collaboration service, a communication service, and any comparable cloud service. The client application 204 may be an independent locally installed application, a client application directly connected to the cloud service, or a module within an operating system of the computing device 202.

The cloud service (e.g., a cloud storage service) may first determine if the user is a subscriber, that is, if the user has an account with the cloud service. If the user is a subscriber, the copy of the file 210 may be stored at a permanent cloud storage 218 and subsequently synchronized with the local version of the file 210 stored in the folder 208 of the hard drive of the computing device 202. If the user is not a subscriber, the copy of the file 210 may be stored at a temporary cloud storage 220. The cloud service may then determine whether there is a previewer available for the file 210 among its registered previewers at an associated store 222. If the cloud service does not have a registered previewer available for a type of the file 210 in its associated store 222, the cloud service may query an external source 224 such as an application store or a database of a preview provider, among other similar sources, and receive an applicable previewer from the external source 224.

Upon determining or obtaining a previewer 226 through one of the above-described approaches, the cloud service may retrieve the file 210 from one of the cloud storages 218 or 220 (permanent or temporary, respectively) and generate a preview 228 using the previewer 226. The preview 228 may range from one or more images reflecting a content of the file 210 to a more complex version with interactive and/or editable elements. Thus, the preview 228 may allow a user to simply view the content or interact with the content to edit and/or share the content of the file 210 at varying functionality levels. The cloud service may send the preview 228 to the computing device 202 to be rendered by the client application 204. In the example scenario, where the user is not a subscriber, the remotely stored copy of the file 210 may be removed from the temporary cloud storage 220. If the user is a subscriber, the remotely stored copy of the file 210 may be left at the permanent cloud storage 218 for future use by the user.

As discussed above, the preview 228 may allow a user to simply view the content or interact with the content of the file 210 at varying functionality levels. For example, the user may select 232 to edit and/or share the file 210 through the preview 228. The level of editing and/or sharing functionality provided to the user may be based on a subscription status of the user, as discussed in greater detail in conjunction with FIGS. 4 and 5 below. For example, if the user is a subscriber of the cloud service, the user may have less restrictive levels of editing and/or sharing functionality. The level of editing functionality provided may define one or more types of edits permitted, a number of edits permitted, a duration for which the file is permitted to be edited, and a duration for which the edited file is to be remotely stored, among other examples. The level of sharing functionality may define users with whom the file is permitted to be shared with, permitted file operations of the users with whom the file is shared, a number of shares permitted, a duration for which the file is permitted to be shared, whether the shared file is permitted to be remotely stored, and a duration for which the shared file is to be remotely stored, among other examples.

In some embodiments, the cloud service may provide incentives or offers 230 to the user to encourage the user to subscribe to the cloud service. The preview 228 may be utilized for that purpose. For example, a non-subscriber user may be provided a simple version of the preview (e.g., read only) along with an option to receive higher functionality version(s) that allow less restrictive editing and/or sharing of the file content if the user subscribes. In another example, the initial preview or a number of previews may be provided with higher functionality followed by a simpler version unless the user subscribes after a predetermined number of previews (for the same file or different files). In further examples, users with different subscription levels may be provided different levels of editing and/or sharing functionality through the preview, where users with higher subscription levels may have more functionalities than those users with lower subscription levels. The different subscription levels may be based on a number or a type of services associated with the cloud service, for example, the user subscribes to.

In yet other examples, a preview provider may allow higher levels of functionality and include advertisements or other marketing material in the preview. Thus, the cloud service may act as an intermediary between users and preview providers. In such a role, the cloud service may collect statistical information such as file types for which previews are being sought for, a number of attempts for previews, user types, file types being edited, a type and a number of edits being made, file types being shared, a number of shares, user types sharing the file and who they are sharing the file with, among other similar information. The information will be anonymized for protection of privacy and provided to preview providers to adjust their marketing strategies.

In some examples, the cloud service may implement security and privacy protection mechanisms such as removing file metadata before providing it to the preview generator, anonymizing user information, and confirming real user requests (as opposed to hot requests).

Figure 3:
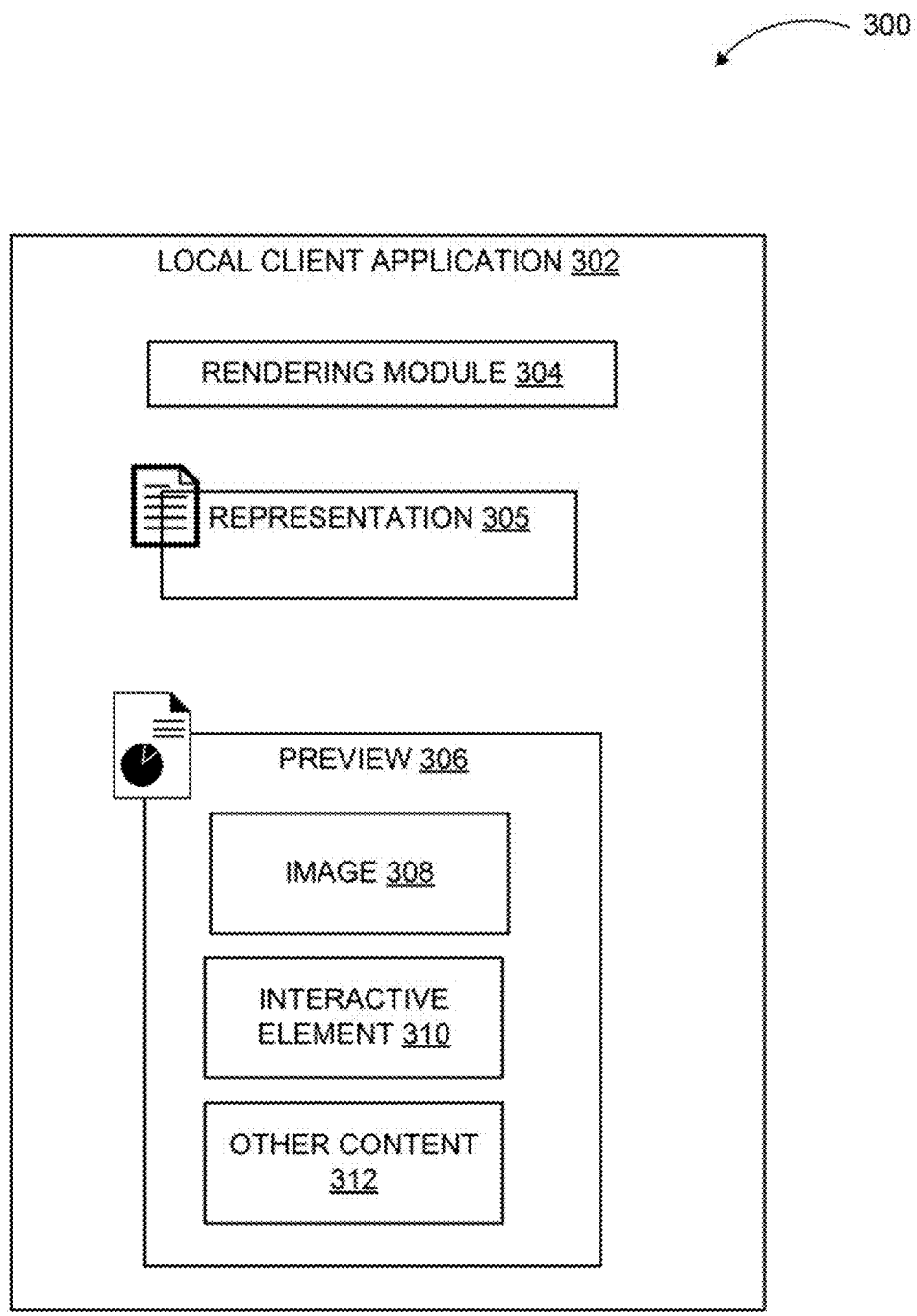
FIG. 3 includes a display diagram illustrating an example of a scheme to provide an instant preview for an unsupported file through which the file may be edited and/or shared, according to embodiments.

FIG. 3 includes a display diagram illustrating an example of a scheme to provide an instant preview for an unsupported file through which the file may be edited and/or shared, according to embodiments.

As shown in a diagram 300, a local client application 302 may include a rendering module 304 for rendering content of files and representations of files, such as representation 305, which may be a an icon, an image, or similar graphic.

Upon receiving a preview 306 of a file, the rendering module 304 may also present the preview 306 to a user. The preview 306, depending on its complexity, may include an image 308 (e.g., read only option), an interactive element 310 (e.g., forms or other elements), and other content 312 (e.g., editable text or graphics).

If the locally stored file is supported by an application or previewer available at the local environment, the rendering module 304 may generate the preview locally using the local application or previewer and render the preview. If there is no local application or previewer available, the rendering module 304 or another component of the local client application 302 may provide a copy of the file to a cloud service, which may generate the preview 306 through a previewer registered with the cloud service or obtained from an external source and send the preview 306 to the local client application 302.

The preview 306 may allow a user to simply view the content or interact with the content of the file by editing and/or sharing at varying functionality levels, for example. The level of functionality provided to the user may be based on a subscription status of the user, that is, whether the user has an account with the cloud service. The subscription status may be a non-subscriber or a subscriber, where there may be many different levels of subscriber based on how many and/or what types of services the user is subscribed to.

In an example scenario, the user may have a .cs file locally stored on a hard drive of his or her computing device. The user may double click on the representation 305 of the file, which the local client application 302 executing on the computing device may detect as a request to access the file. However, the computing device may not have an application installed locally that is capable of supporting that file type (i.e., a cs file extension) and thus a local previewer may not be available, which prevents the file from being viewed, edited, and/or shared. Conventionally, at this point, the user would receive a prompt asking him or her to associate an application with this file type. However, according to embodiments, if a local previewer is not available, the local client application 302 may send a copy of the file to a cloud service, which may determine if the preview 306 may be generated. For example, the cloud service may determine whether there is a previewer available for the file among its registered previewers or if not, whether there is a previewer available at an external source that can be obtained. If a previewer is available through one of the above-mentioned means, the cloud service may generate the preview 306 through the previewer and provide the preview 306 to the local client application 302. The local client application 302 may be configured to render the preview 306 through the rendering module 304.

The preview 306 may be rendered such that the user may edit the file on the computing device without having to install an application that supports the file type and without having to subscribe to the cloud service. However, the user may be limited on how he or she may edit the file based on a level of editing functionality provided through the preview 306. For example, the level of editing functionality may define the types of editing permitted, a number of edits permitted, a duration for which the file is permitted to be edited, and a duration for which the edited file is to be remotely stored. The level of editing functionality may be based on a subscription status of the user as discussed in greater detail in conjunction with FIG. 4 below. Once the user has completed his or her edits and selected a save command control on the preview 306, the edited version of the file may be automatically synchronized to the hard drive of the computing device and may replace the original version of the file stored there.

The user may then decide to share the file with others. The user may select a share command control and stipulate one or more recipients with whom the file is being shared with, if those recipients have view, edit, and/or share permissions, and for how long the sharing request should last through the preview 306. The user's stipulations may be limited based on a level of sharing functionality provided to the user through the preview 306. For example, the level of sharing functionality may define users with whom the file may be shared with (e.g., a type of user), permitted file operations of the users with whom the file is shared (e.g., view, edit, and/or share permissions), a number of shares permitted, a duration for which the file is permitted to be shared, whether the shared file is permitted to be remotely stored, and a duration for which the shared file is to be remotely stored. The level may be based on a subscription status of the user, as discussed in greater detail in conjunction with FIG. 5 below.

The shared file may be sent to the cloud service to be stored in remote storage associated with the cloud service, where the shared file may be stored in permanent storage or temporary storage based on the subscription status of the user. The cloud service may generate a link for the location at which the shared file is remotely stored and provide the link to the recipients of the shared file through a communication item, such as an email or text message, for example. Upon selection of the link, the recipients may be enabled to view, edit, and/or share the file in a same manner the user did (i.e., through the preview 306), without having to install an application to support the file type on their computing devices or without having to become a subscriber to the cloud service.

Figure 4:
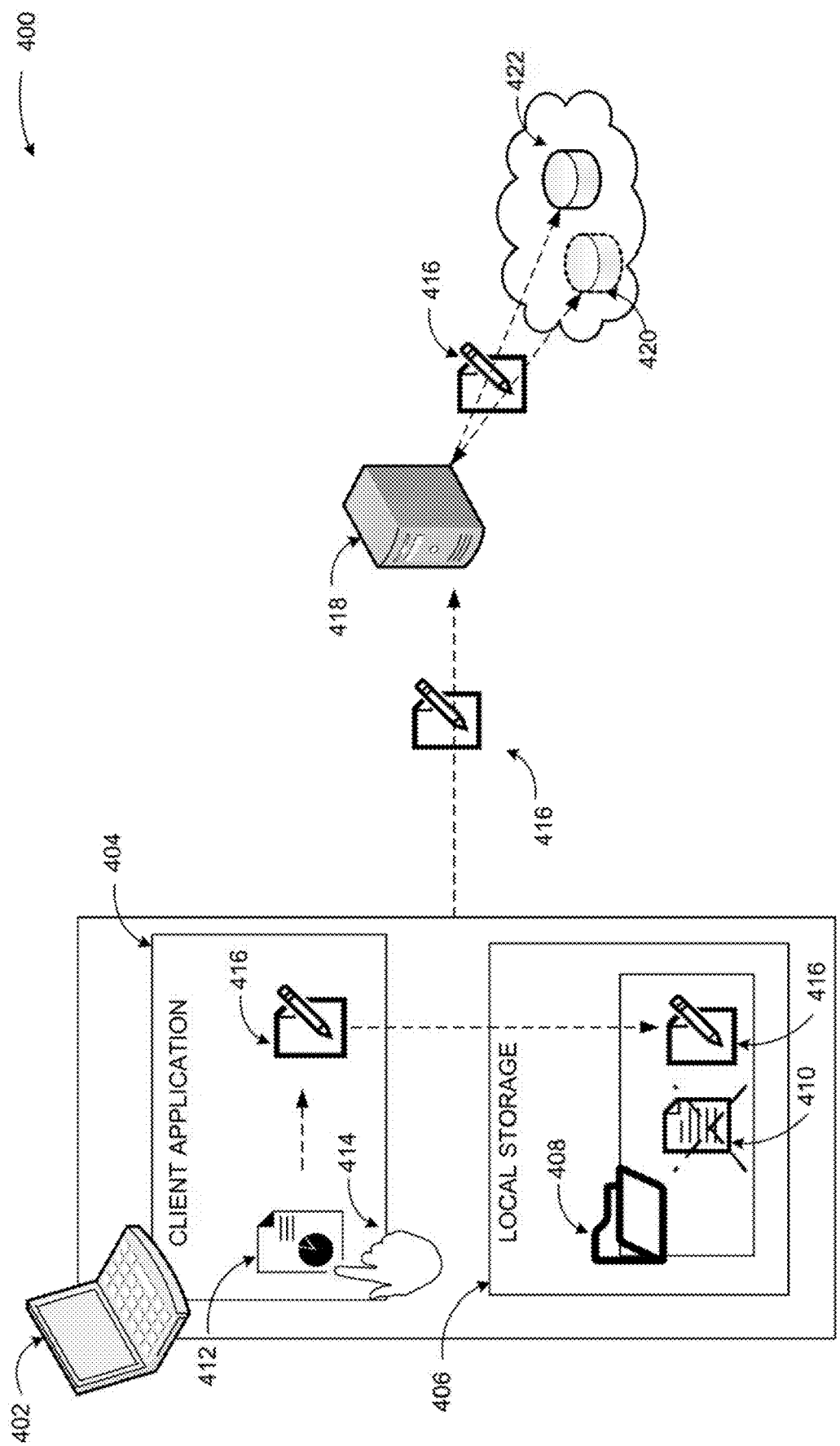
FIG. 4 includes a display diagram illustrating example components and actions for editing an unsupported file through an instantly generated preview, according to embodiments.

FIG. 4 includes a display diagram illustrating example components and actions for editing an unsupported file through an instantly generated preview, according to embodiments.

As shown in a diagram 400, upon detection of a user's request to access a file 410 stored in local storage 406 (e.g., in a folder 408 of a hard drive) of a computing device 402, and in response to a determination that no local application or previewer is available, a client application 404 may send a request to a cloud service to generate a preview 412 of the file 410. The cloud service may be executed by a server 418 and include a cloud storage service, a productivity service, a collaboration service, a communication service, and any comparable cloud service, for example. The cloud service may generate the preview 412, as described in detail in conjunction with FIGS. 1 through 3 above, and provide the preview 412 to the client application 404 for rendering to the user.

The user may view and edit 414 contents of the file 410 through the preview 412 to create an edited file 416. Once the user completes his or her edits and selects a save command control through the preview 412, the edited file 416 may be provided to the cloud service to be remotely stored at one of a permanent cloud storage 422 or a temporary cloud storage 420. Additionally and/or alternatively, the file 410 that is stored in local storage 406 may be replaced with the edited file 416. For example, if the user is a subscriber, that is, the user has an account with the cloud service and is logged into the account, the edited file 416 may be uploaded automatically to a folder associated with the user's account within permanent cloud storage 422 of the cloud service. If the user is not a subscriber and/or is not logged into the account, the edited file 416 may be uploaded to temporary cloud storage 420 of the cloud service or may only just be stored in the local storage 406. Thus, through the preview 412, the user may be able to edit and save the file 410 without having to install an application that supports a type of the ile 410 on the computing device 402 and without having to become a subscriber or a higher level subscriber to the cloud service.

However, in some embodiments, the user may be limited in the edits he or she can make to the file 410 based on a level of editing functionality provided through the preview 412. The level of editing functionality may define what types of editing are permitted (e.g., modification of text, formatting, and/or graphics), a number of edits permitted, a duration for which the file 410 is permitted to be edited, and a duration for which the edited file 416 is to be remotely stored. The level of editing functionality may be based on a subscription status of the user. The subscription status may be a non-subscriber or a subscriber, where there may be many different levels of subscriber based on how many and/or what types of services the user is subscribed to. For example, a non-subscriber may have a more restrictive level of editing functionality compared to a subscriber, and a lower level subscriber may have a more restrictive level of editing functionality compared to a higher level subscriber. Thus, in an example scenario, if the user is a non-subscriber, the user may only be able to make modifications to the formatting of the file 410 and for a limited duration through the preview 412, where the edited file 416 may be remotely stored only temporarily. In another example scenario, if the user is a high level subscriber, the user may make any type of modification to the file 410 for an indefinite period of time through the preview 412, where the edited file 416 may be remotely stored indefinitely.

In other embodiments, the user may be presented incentives and/or offers through the preview 412 that are associated with the level of editing functionality. For example, an offer to provide the user more editing capabilities (i.e., a less restrictive level of editing functionality) may be presented to the user in exchange for the user updating his or her subscription status. For example, if the user is a non-subscriber, the user may receive the offer if he or she updates to a subscriber, or if the user is already a subscriber, the user may receive the offer if he or she updates to a higher level of subscriber by adding additional services to his or her subscription.

Figure 5:
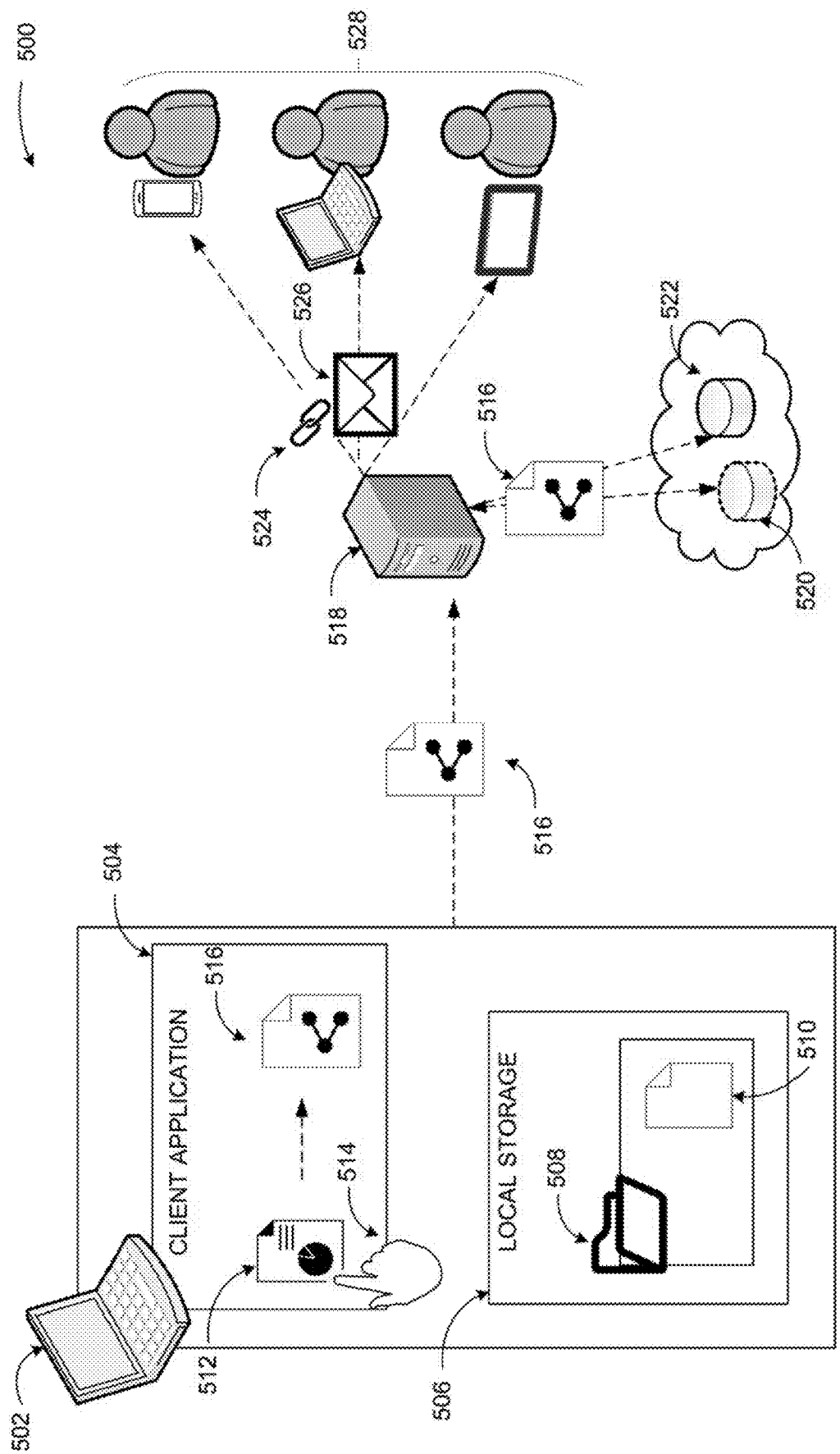
FIG. 5 includes a display diagram illustrating example components and actions for sharing an unsupported file through an instantly generated preview, according to embodiments.

FIG. 5 includes a display diagram illustrating example components and actions for sharing an unsupported file through an instantly generated preview, according to embodiments.

As shown in a diagram 500, upon detection of a user's request to access a file 510 stored in local storage 506 (e.g., in a folder 508 of a hard drive) of a computing device 502, and in response to a determination that no local application or previewer is available, a client application 504 may send a request to a cloud service to generate a preview 512 of the file 510. The cloud service may be executed by a server 518 and include a cloud storage service, a productivity service, a collaboration service, a communication service, and any comparable cloud service, for example. The cloud service may generate the preview 512, as described in detail in conjunction with FIGS. 1 through 3 above, and provide the preview 512 to the client application 504 for rendering to the user.

The user may view and share 514 contents of the file 510 through the preview 512. In some examples, the user may also edit the contents of the file 510 through the preview 512 in a similar manner as described in conjunction with FIG. 4 before sharing. The user may select recipients 528 with whom to share the file 510 and file operations those recipients are permitted to perform (e.g., view, edit, and/or share and to what extent or a duration for which the operations are permitted) through the preview 512. However, these selections may be limited based on a level of sharing functionality provided to the user through the preview 512, described in detail in the paragraphs that follow. Once the user selects a share command control through the preview 512, the shared file 516 may be provided to the cloud service to be remotely stored at one of a permanent cloud storage 522 or a temporary cloud storage 520. For example, if the user is a subscriber, that is, the user has an account with the cloud service and is logged into the account, the shared file 516 may be uploaded automatically to a folder associated with the user's account within permanent cloud storage 522 of the cloud service. If the user is not a subscriber and/or is not logged into the account, the shared file 516 may be uploaded to temporary cloud storage 520 of the cloud service.

The cloud service may then generate a link 524 for a location at which the shared file 516 is remotely stored (either the permanent cloud storage 522 or temporary cloud storage 520) and provides the link 524 to the selected recipients 528 of the shared file 516 through a communication item 526. The communication item 526 may be a text message or an email message, among other similar communication items. The recipients 528 may be able to select the link 524 within the communication item 526 in order to view, edit, and/or share the shared file 516 in a similar manner to the user (e.g., through the preview 512). By using the preview 512, no applications had to be installed on the computing device 502 of the user or the computing devices of the recipients 528. Additionally, the user or the recipients 528 did not have to become subscribers to the cloud service in order to share and interact with the file type associated with the file 510.

As previously mentioned, in some embodiments, the user may be limited in how he or she can share the file 510 based on a level of sharing functionality provided through the preview 512. The level of sharing functionality may define users with whom the file 510 is permitted to be shared with (e.g., a type of user), permitted file operations of the users with whom the file 510 is shared (e.g., view, edit, and/or share and to what extent or duration), a number of shares permitted, a duration for which the file 510 is permitted to be shared, whether the shared file 516 is permitted to be remotely stored, and a duration for which the shared file 516 is to be remotely stored. The level of editing functionality may be based on a subscription status of the user. The subscription status may be a non-subscriber or a subscriber, where there may be many different levels of subscriber based on how many and/or what types of services the user is subscribed to. In some embodiments, a non-subscriber may have a more restrictive level of sharing functionality compared to a subscriber, and a lower level subscriber may have a more restrictive level of sharing functionality compared to a higher level subscriber. Thus, in an example scenario, if the user is a non-subscriber, the user may only be able to share the file 510 with a limited number of users who are subscribers and for a limited duration through the preview 512, where the shared file 516 may be remotely stored in the temporary cloud storage 520. In another example scenario, if the user is a high level subscriber, the user may share the file 510 with any number and type of users for an indefinite period of time through the preview 512, where the shared file 516 may be remotely stored in the permanent cloud storage 522.

In other embodiments, the user may be presented incentives and/or offers through the preview 512 that are associated with the level of editing functionality. For example, an offer to provide the user more sharing capabilities (i.e., a less restrictive level of sharing functionality) may be presented to the user in exchange for the user updating his or her subscription status. For example, if the user is a non-subscriber, the user updates to a subscriber, or if the user is a subscriber, the user updates to a higher level of subscriber by adding additional services to his or her subscription.

The example scenarios and schemas in FIG. 1 through 5 are shown with specific systems, servers, devices, components, and configurations. Embodiments are not limited to systems according to these example configurations. Editing and/or sharing an unsupported file through an instantly generated preview may be implemented in configurations employing fewer or additional components in applications and user interfaces. Furthermore, the example schema and systems shown in FIG. 1 through 5 and their components may be implemented in a similar manner with other values using the principles described herein.

Figure 6:
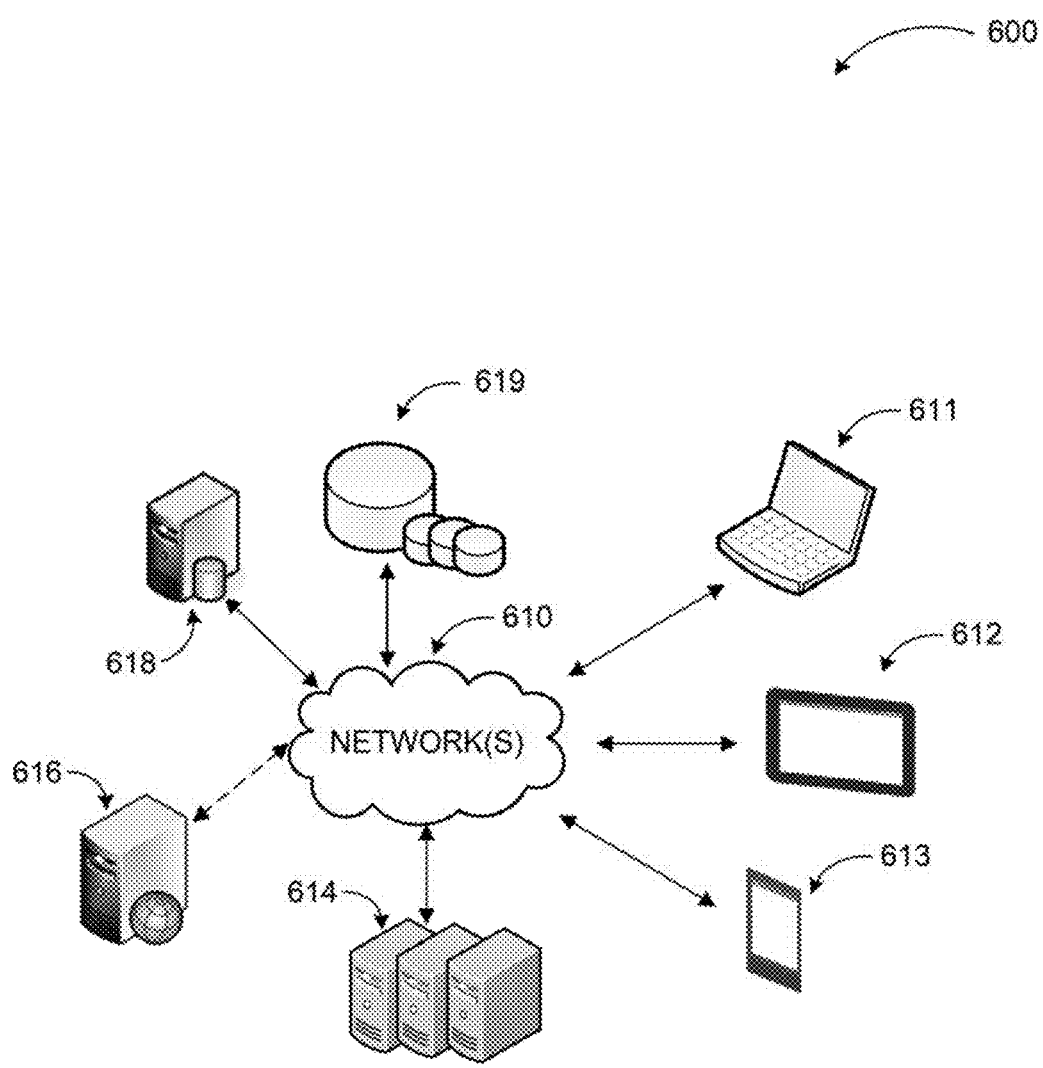
FIG. 6 is a simplified networked environment, where a system according to embodiments may be implemented.

FIG. 6 is an example networked environment, where embodiments may be implemented. A local client application such as a file management and/or synchronization application may work with a cloud service configured to enable editing and sharing of an unsupported file through an instantly generated preview via software executed over one or more servers 614. The platform may communicate with client applications on individual computing devices such as a smart phone 613, a mobile computer 612, or desktop computer 611 ('client devices') through network(s) 610.

Client applications executed on any of the client devices 611-613 may facilitate communications via application(s) executed by servers 614, or on individual server 616. A cloud service executed on servers 614 or individual server 616 may receive a locally stored file from a client application upon detection of user interest on the file by the client application and confirmation that there is no local preview support for the file. The service may determine a previewer for the file among previewers registered with the service or from an external resource if there is no applicable previewer registered with the service. The service may generate a preview of the file using the determined previewer and transmit the preview to the client application. The preview may be a rich instant preview with particular levels of functionality such as editing and sharing functionalities. Data associated with the previews and previewers may be stored in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to edit and/or share an unsupported file through an instantly generated preview. Furthermore, the networked environments discussed in FIG. 6 are for illustration purposes only. Embodiments are not limited to the example applications, modules, or processes.

Figure 7:
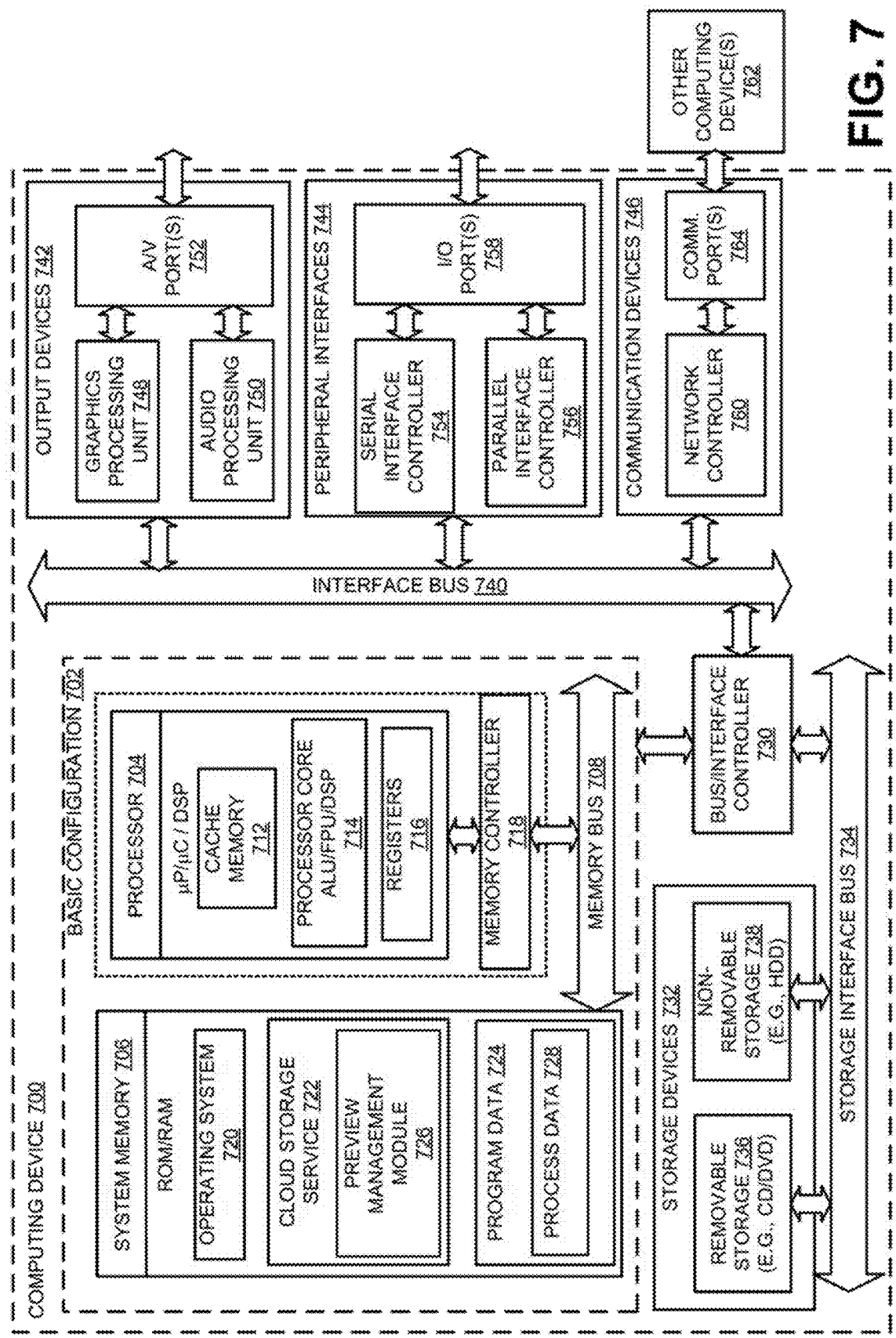
FIG. 7 is a block diagram of an example computing device, which may be used to provide an instant preview for an unsupported file through which the file may be edited and/or shared, according to embodiments.

FIG. 7 is a block diagram of an example computing device, which may be used to provide an instant preview for an unsupported file through which the file may be edited and/or shared, according to embodiments.

For example, computing device 700 may be used as a server, or similar device. In an example basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), a graphics processing unit (GPU), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a cloud storage service 722, and a program data 724. The cloud storage service 722 may include components such as a preview management module 726. The preview management module 726, in response to receiving a request for a preview for a locally stored file and a copy of the locally stored file from a client application, may query a previewer registry to determine a previewer associated with the received file and generate the preview using the registered previewer. The preview management module 726 may then define a level of editing functionality and a level of sharing functionality based on a subscription status of a user associated with the locally stored file, and provide the preview to the client application such that the file can be edited or shared based on the level of editing functionality or the level of sharing functionality, respectively, through the registered previewer. The program data 724 may include, among other data, process data 728, such as a list of registered previewers and corresponding file types, subscription status of the user, level of functionality provided through the previewer, and incentives or offers, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 730, which may be configured to communicate to various external devices such as a display or speakers via one or more A/V ports 732. One or more example peripheral interfaces 744 may include a serial interface controller 734 or a parallel interface controller 736, which may be configured to communicate with external devices such as input devices (for example, keyboard, mouse, pen, voice input device, touch input device, etc.) or other peripheral devices (for example, printer, scanner, etc.) via one or more I/O ports 738. An example of the communication device(s) 746 includes a network controller 760, which may be arranged to facilitate communications with one or more other computing devices 762 over a network communication link via one or more communication ports 764. The one or more other computing devices 762 may include servers, computing devices, and comparable devices. For example, input to and output out of the client application, which may be a file management or synchronization application, for example, may be transmitted through one of the communication devices 764 that may be communicatively coupled (e.g., wired or wirelessly) to the computing device 700.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a specialized server, mainframe, or similar computer, which includes any of the above functions. The computing device 700 may also be implemented as a personal computer including both laptop computer and non-laptop computer configurations. Additionally, the computing device 700 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to edit and/or share an unsupported file through an instantly generated preview. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that may be machine automated.

Figure 8:
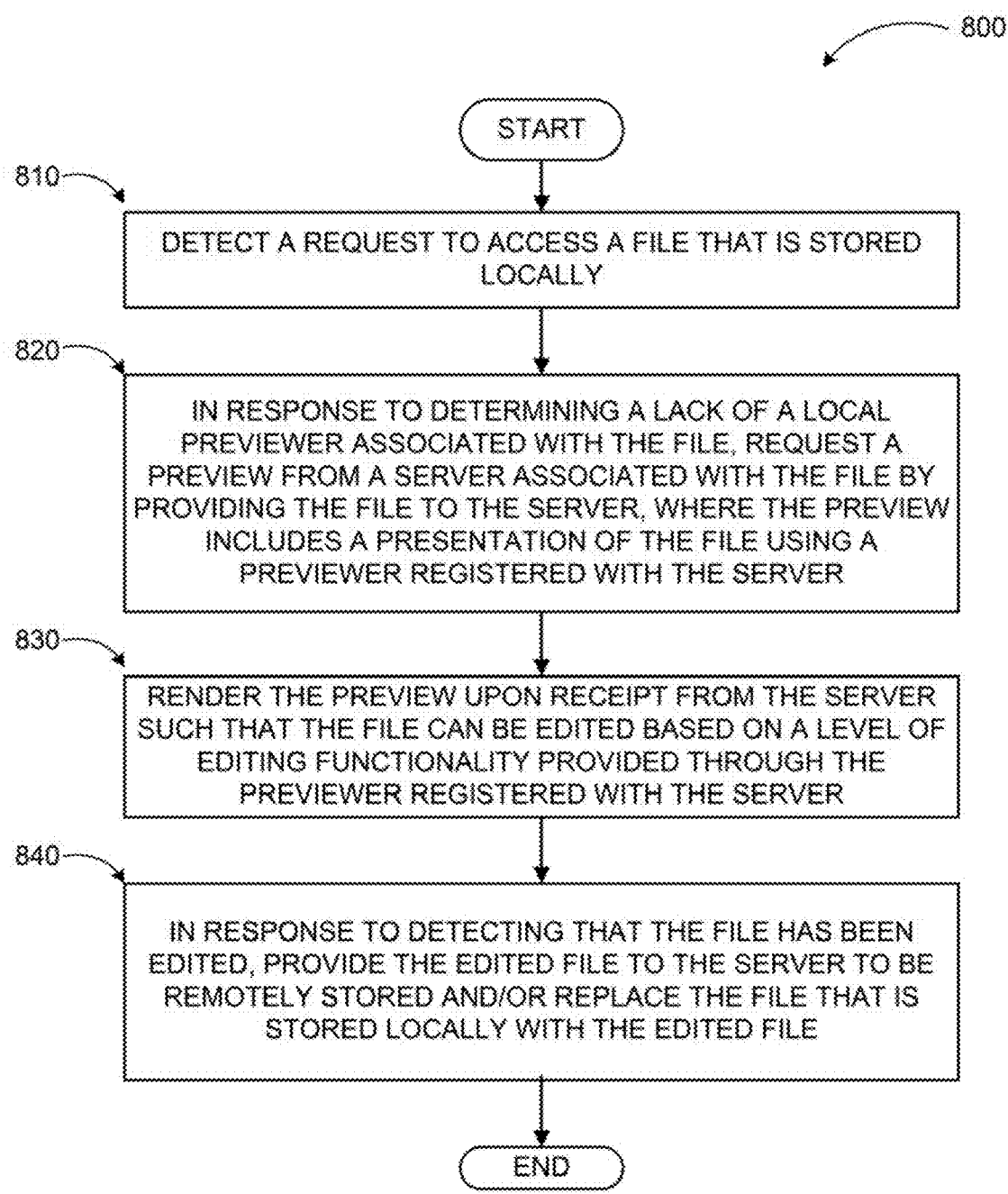
FIG. 8 is a logic flow diagram illustrating a process for editing an unsupported file through an instantly generated preview, according to embodiments.

FIG. 8 is a logic flow diagram illustrating a process for editing an unsupported file through a generated preview, according to embodiments. Process 800 may be implemented on a computing device or another system. An example computing device comprises a communication interface to facilitate communication between the computing device and a server configured to host a service associated with a type of the file. The example server may also comprise a memory to store instructions, and one or more processors coupled to the memory. The processors, in conjunction with the instructions stored on the memory, may be configured to execute a local client application configured to enable editing of an unsupported file through a generated preview.

Process 800 begins with operation 810, where the processors may be configured to detect a request to access a file that is stored locally at the computing device. For example, the processors may detect a hover action, a click action, or a tap action performed by a user on a representation of the locally stored file through a user interface of the local client application.

At operation 820, in response to determining a lack of a local previewer associated with the file, the processors may be configured to request a preview from the server by providing the file to the server, where the preview includes a presentation of the file using a previewer registered with the server. In some embodiments, an operating system of the computing device may be queried for a local previewer in order to determine the lack of the local previewer associated with the file. For example, a lack of local previewer may be determined if the query of the operating system returns results that indicate none of the locally installed applications on the computing device support a type of the file.

At operation 830, the processors may be configured to render the preview upon receipt from the server such that the file can be edited based on a level of editing functionality provided through the previewer registered with the server. The level of editing functionality provided may be based on a subscription status of the user and may define one or more types of edits permitted, a number of edits permitted, a duration for which the file is permitted to be edited, and a duration for which the edited file is to be remotely stored. For example, a more restrictive level of editing functionality may be provided if the subscription status of the user is a non-subscriber such that the user is limited in the type or number of edits, and/or a duration for which the file may be edited or remotely stored. In some embodiments, incentives and/or offers associated with the level of editing functionality may be provided to the user. For example, an offer may provide the user a less restrictive level of editing functionality if the user updates their subscription status from non-subscriber to subscriber or, if the user is already a subscriber, the offer may be provided if the user adds additional services to their subscription.

At operation 840, in response to detecting that the file has been edited, the processors may be configured to provide the edited file to the server to be remotely stored and/or replace the file that is stored locally with the edited file. In some embodiments, whether and/or how the edited filed is remotely stored may be based on the subscription status of the user. For example, if the user is a subscriber the edited file may be remotely stored in permanent cloud storage for an indefinite period of time. However, if the user is a non-subscriber the edited file may only be remotely stored in temporary cloud storage for a limited period of time or not at all.

The operations included in process 800 is for illustration purposes. Editing an unsupported file through a generated preview may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

Figure 9:
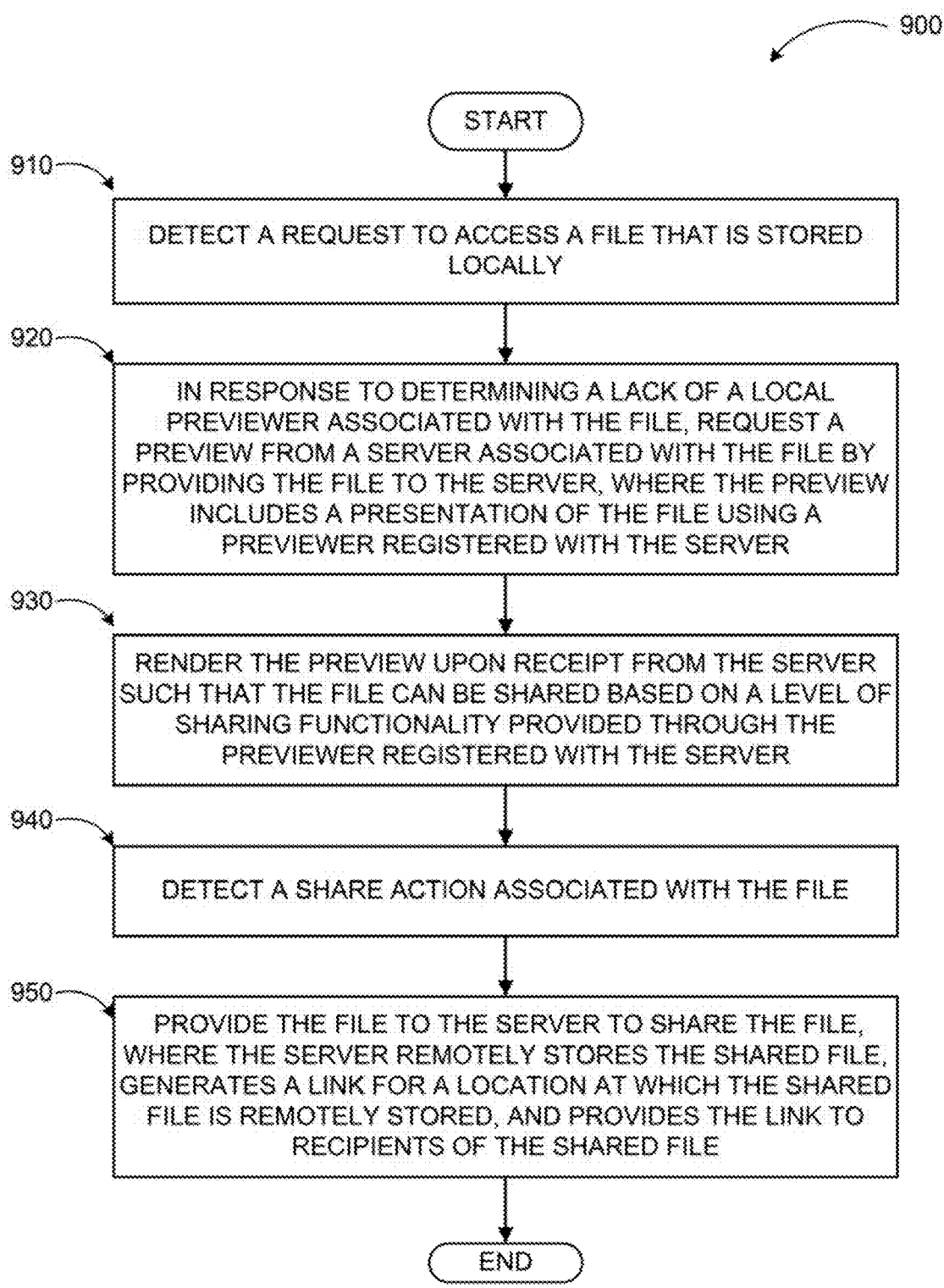
FIG. 9 is a logic flow diagram illustrating a process for sharing an unsupported file through an instantly generated preview, according to embodiments.

FIG. 9 is a logic flow diagram illustrating a process for sharing an unsupported file through a generated preview, according to embodiments. Process 900 may be implemented on a computing device or another system. An example computing device comprises a communication interface to facilitate communication between the computing device and a server configured to host a service associated with a type of the file. The example server may also comprise a memory to store instructions, and one or more processors coupled to the memory. The processors, in conjunction with the instructions stored on the memory, may be configured to execute a local client application configured to enable sharing of an unsupported file through a generated preview.

Process 900 begins with operation 910, where the processors are configured to detect a request to access a file that is stored locally. For example, the processors may detect a hover action, a click action, or a tap action performed by a user on a representation of the locally stored file through a user interface of the local client application.

At operation 920, in response to determining a lack of a local previewer associated with the file, the processors may be configured to request a preview from the server by providing the file to the server, where the preview includes a presentation of the file using a previewer registered with the server. In some embodiments, an operating system of the computing device may be queried for a local previewer in order to determine the lack of the local previewer associated with the file. For example, a lack of local previewer may be determined if the query of the operating system returns results that indicate none of the locally installed applications on the computing device support a type of the file.

At operation 930, the processors may be configured to render the preview upon receipt from the server such that the file can be shared based on a level of sharing functionality provided through the previewer registered with the server. The level of sharing functionality may be based on a subscription status of the user and may define users with whom the file is permitted to be shared with, permitted file operations of the users with whom the file is shared, a number of shares permitted, a duration for which the file is permitted to be shared, whether the shared file is permitted to be remotely stored, and a duration for which the shared file is to be remotely stored. For example, a more restrictive level of sharing functionality may be provided if the subscription status of the user is a non-subscriber such that the user is limited in the number of shares, a type of recipients whom the file may be shared with, and/or a duration for which the file is to be shared or remotely stored. In some embodiments, incentives and/or offers associated with the level of sharing functionality may be provided to the user. For example, an offer may provide the user a less restrictive level of sharing functionality if the user updates their subscription status from non-subscriber to subscriber or, if the user is already a subscriber, the offer may be provided if the user adds additional services to their subscription.

At operation 940, the processors may be configured to detect a share action associated with the file. For example, the user may select a shame command control and stipulate one or more recipients with whom the file is being shared with, if those recipients have view, edit, and/or share permissions, and for how long the sharing request should last through the preview. However, the user's stipulations may be limited based on the above discussed level of sharing functionality provided to the user through the previewer.

At operation 950, the processors may be configured to provide the file to the server to share the file. The server may remotely store the shared file, generate a link for a location at which the shared file is remotely stored, and provide the link to recipients of the shared file. The shared file may be remotely stored at temporary storage or permanent storage associated with the server based on whether the user is a non-subscriber or a subscriber, respectively. The link may be provided to the recipients through a communication item such that the recipients can view, edit, and/or share the shared file (based on the permissions given to each recipient) through the previewer registered with the server upon selection of the link. Accordingly, the recipients can view, edit, and/or share the shared file without having to install an application that supports a type of the file on their computing devices and without having to subscribe to any cloud based services.

The operations included in process 900 is for illustration purposes. Sharing an unsupported file through a generated preview may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

According to some embodiments, means to edit and/or share an unsupported file through an instantly generated preview may be provided. Example means may include detecting a request from a user to access a file that is stored locally, and in response to determining a lack of a local previewer associated with the file, requesting a preview from a server associated with the file by providing the file to the server, where the preview may include a presentation of the file using a previewer registered with the server. Example means may also include rendering the preview upon receipt from the server such that the file can be edited and/or shared based on a level of editing functionality or a level of sharing functionality, respectively, provided through the previewer, where the level of editing functionality and the level of sharing functionality may be based on a subscription status of the user. In response to detecting that the file has been edited, example means may further include providing the edited file to the server to be remotely stored and/or replacing the file that is stored locally with the edited file. In response to detecting a share action associated with the file, example means may further include providing the file to the server to share the file, where the server may remotely store the shared file, generate a link for a location at which the shared file is remotely stored, and provide the link to recipients of the shared file.

According to some examples, methods to edit an unsupported file through an instantly generated preview may be provided. An example method may include detecting a request from a user to access a file that is stored locally, and in response to determining a lack of a local previewer associated with the file, requesting a preview from a server associated with the file by providing the file to the server, where the preview may include a presentation of the file using a previewer registered with the server. The example method may also include rendering the preview upon receipt from the server such that the file can be edited based on a level of editing functionality provided through the previewer, where the level of editing functionality may be based on a subscription status of the user, and in response to detecting that the file has been edited, providing the edited file to the server to be remotely stored and/or replacing the file that is stored locally with the edited file.

In other examples, the level of editing functionality may include one or more types of editing permitted, a number of edits permitted, a duration for which the file is permitted to be edited, and a duration for which the edited file is to be remotely stored. The subscription status of the user may be a subscriber or a non-subscriber of a cloud service provided by the server. A more restrictive level of editing functionality may be provided if the subscription status of the user is a non-subscriber.

In further examples, an incentive or an offer associated with the level of editing functionality may be received from the server to be provided to the user through the previewer. The incentive or the offer may include to provide a less restrictive level of editing functionality if the user updates the subscription status of the user. The lack of the local previewer associated with the file may be determined by querying an operating system of a computing device that stores the file for the local previewer.

According to some embodiments, methods to share an unsupported file through an instantly generated preview may be provided. An example method may include detecting a request from a user to access a file that is stored locally, and in response to determining a lack of a local previewer associated with the file, requesting a preview from a server associated with the file by providing the file to the server, where the preview may include a presentation of the file using a previewer registered with the server. The example method may also include rendering the preview upon receipt from the server such that the file can be shared based on a level of sharing functionality provided through the previewer registered with the server, where the level of sharing functionality may be based on a subscription status of the user. The example method may further include detecting a share action associated with the file and providing the file to the server to share the file, where the server may remotely store the shared file, generate a link for a location at which the shared file is remotely stored, and provide the link to recipients of the shared file.

In other embodiments, the level of sharing functionality may include users with whom the file is permitted to be shared with, permitted file operations of the users with whom the file is shared, a number of shares permitted, a duration for which the file is permitted to be shared, whether the shared file is permitted to be remotely stored, and a duration for which the shared file is to be remotely stored. The subscription status of the user may be a subscriber or a non-subscriber of a cloud service provided by the server. A more restrictive level of sharing functionality may be provided if the subscription status of the user is a non-subscriber.

In further embodiments, an incentive or an offer associated with the level of sharing functionality may be received from the server to be provided to the user. The incentive or the offer may include to provide a less restrictive level of sharing functionality if the user updates the subscription status of the user to a subscriber. Detecting the share action associated with the file may include detecting a selection of the recipients with whom the file is to be shared with, view, edit, and/or share permissions associated with each of the recipients, and a duration for which the file is permitted to be shared, where the selection may be limited by the level of sharing functionality.

According to some examples, methods to provide an instant preview of a locally unsupported file through which the file is edited and/or shared may be provided. An example method may include receiving a request for a preview for a locally stored file and a copy of the locally stored file from a client application upon detection of a request from a user to access the locally stored file and determination of a lack of a local previewer associated with the locally stored file by the client application. The example method may also include querying a previewer registry associated with a server receiving the file to determine a previewer associated with the received file, generating the preview using a registered previewer if the registered previewer associated with the file is found, defining a level of editing functionality and a level of sharing functionality based on a subscription status of the user, and providing the preview to the client application such that the file can be edited and/or shared based on the level of editing functionality or the level of sharing functionality, respectively, through the registered previewer. The example method may further include, if the file has been edited, receiving the edited file from the client application to be remotely stored, and if the file has been shared, receiving the shared file from the client application to be remotely stored at the server, generating a link for a location at which the shared file is remotely stored, and providing the link to recipients of the shared file.

In other examples, defining the level of editing functionality or the level of sharing functionality may include receiving information from the client application regarding the subscription status of the user, where the subscription status may be a subscriber or a non-subscriber of a cloud service provided by the server, and providing a more restrictive level of editing functionality or a more restrictive level of sharing functionality if the subscription status of the user is a non-subscriber.

An incentive or an offer associated with the level of editing functionality or the level of sharing functionality may be provided to the user associated with the locally stored file, where the incentive or the offer may include to provide a less restrictive level of editing functionality or a less restrictive level of sharing functionality in response to the subscription status of the user being updated. The subscription status of the user may be updated if the subscription status of the user is updated from a non-subscriber to a subscriber or additional services are added to the user's current subscription.

In further examples, the link may be provided to the recipients of the shared file through a communication item such that the recipients can view, edit, and/or share the shared file through the previewer registered with the server upon selection of the link. If the registered previewer associated with the file is not found, an external source may be queried to obtain a previewer in order to generate the preview.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to edit an unsupported file through an instantly generated preview, the method comprising:
   detecting, with a client application installed at a computing device, a request from a user to access a file that is stored locally on the computing device;
   in response to determining a lack of a local previewer associated with the file installed on the computing device, requesting, with the client application installed at the computing device, a preview of the file from a server by providing the file from the computing device to the server, wherein the preview includes a presentation of the file using a previewer registered with the server;
   receiving, with the client application installed at the computing device, the preview from the server;
   rendering, with the client application installed at the computing device, the preview upon receipt of the preview from the server, the client application executed on the computing device providing editing functionality for content included in the presentation such that the file can be edited at the computing device, wherein a level of the editing functionality provided through the client application executed on the computing device is based on a subscription status of the user with the server; and
   in response to detecting that content included the file has been edited through the client application, one or more of providing the edited file from the computing device to the server to be remotely stored or replacing the file that is stored locally on the computing device with the edited file.

2. The method of claim 1, wherein the level of editing functionality includes one or more types of editing permitted, a number of edits permitted, a duration for which the file is permitted to the edited, and a duration for which the edited file is to be remotely stored.

3. The method of claim 1, wherein the subscription status of the user is one of a subscriber or a non-subscriber of a cloud service provided by the server.

4. The method of claim 1, further comprising:
   providing a more restrictive level of editing functionality when the subscription status of the user is a non-subscriber as compared to a subscriber.

5. The method of claim 1, further comprising:
   receiving one of an incentive or an offer associated with the level of editing functionality from the server to be provided to the user through the previewer.

6. The method of claim 5, wherein the one of the incentive or the offer include to provide a less restrictive level of editing functionality if the user updates the subscription status of the user.

7. The method of claim 1, further comprising:
   determining the lack of the local previewer associated with the file by querying an operating system of the computing device.

\* \* \* \* \*